(12) United States Patent  
Zheng (10) Patent No.: US 9,197,451 B2
(45) Date of Patent: Nov. 24, 2015

(54) METHOD, APPARATUS, AND SYSTEM FOR DISTRIBUTING LABEL IN SEAMLESS MULTI-PROTOCOL LABEL SWITCHING NETWORK

(75) Inventor: Ruobin Zheng, Shenzhen (CN)

(73) Assignee: HUAWEI TECNOLOGIES CO., LTD., Shenzhen (CN)

( * ) Notice: Subject to any disclaimer, the term of this patent is extended or adjusted under 35 U.S.C. 154(b) by 85 days.

(21) Appl. No.: 13/566,450

(22) Filed: Aug. 3, 2012

(65) Prior Publication Data

US 2013/0003740 A1    Jan. 3, 2013

Related U.S. Application Data

(63) Continuation of application No. PCT/CN2010/080480, filed on Dec. 30, 2010.

(30) Foreign Application Priority Data

Feb. 5, 2010    (CN) .......................... 2010 1 0106598

(51) Int. Cl.
*H04L 12/46* (2006.01)
*H04L 12/66* (2006.01)

(52) U.S. Cl.
CPC ............ *H04L 12/66* (2013.01); *H04L 12/4633* (2013.01)

(58) Field of Classification Search
CPC .......... H04L 45/68; H04L 41/12; H04L 45/02
See application file for complete search history.

(56) References Cited

U.S. PATENT DOCUMENTS 7,710,872 B2 * 5/2010 Vasseur ................... H04L 45/50
                                                          370/230
8,121,126 B1 * 2/2012 Moisand ................. H04L 45/50
                                                          370/392

(Continued)

FOREIGN PATENT DOCUMENTS

CN      101505227      8/2009
CN      101552711      10/2009

(Continued)

OTHER PUBLICATIONS

International Search Report of PCT/CN2010/080480 mailed Mar. 10, 2011.

(Continued)

*Primary Examiner* — Andrew Lai
*Assistant Examiner* — Zhiren Qin
(74) *Attorney, Agent, or Firm* — Staas & Halsey LLP (57) ABSTRACT

The present invention discloses a method, apparatus, and system for allocating a label in a seamless multi-protocol label switching network, which greatly reduces the complexity of the access node device, effectively cuts down the operation costs for the operator, and enhances the scalability of the system. The method includes: obtaining label information of a first access node, where the label information comprises the pseudowire PW destination address of the first access node; and sending the label information to a second router by using a BGP message or a T-LDP message so that the second router configures a PW label and/or a flow label of the first access node to a second access node by using the access network configuration protocol according to the label information.

13 Claims, 7 Drawing Sheets

(56) References Cited

U.S. PATENT DOCUMENTS

| | | | |
|---|---|---|---|
| 8,331,243 B2 * | 12/2012 | Mohan | H04L 12/4633 370/241.1 |
| 8,351,325 B2 * | 1/2013 | Hinz | H04L 45/68 370/218 |
| 8,521,896 B2 * | 8/2013 | Liu | H04L 12/4633 370/352 |
| 8,611,359 B1 * | 12/2013 | Kompella | H04L 45/04 370/401 |
| 8,705,374 B1 * | 4/2014 | D'Souza | H04L 65/104 370/229 |
| 2004/0170173 A1 * | 9/2004 | Pan | H04J 3/1617 370/392 |
| 2006/0182122 A1 * | 8/2006 | Davie | H04L 12/2854 370/395.53 |
| 2008/0205271 A1 | 8/2008 | Aissaoui et al. | |
| 2008/0285466 A1 * | 11/2008 | Salam | H04L 41/0226 370/241.1 |
| 2012/0008622 A1 | 1/2012 | Cao et al. | |
| 2012/0099861 A1 | 4/2012 | Zheng | |

FOREIGN PATENT DOCUMENTS

| | | |
|---|---|---|
| CN | 101631072 | 1/2010 |
| CN | 101931548 | 12/2010 |
| WO | 2008/104963 | 9/2008 |

OTHER PUBLICATIONS

Stewart Bryant et al., "PWE3 Architecture", Cisco Systems, Mar. 2003.

Ping Pan, "Dry Martini: Supporting Pseudo-wires in Sub-IP Access Networks", Hammerhead Systems, Jul. 2005.

E. Rosen, "Pseudowire Setup and Maintenance Using the Label Distribution Protocol (LDP)", Cisco Systems, Apr. 2006.

Extended European Search Report dated Feb. 28, 2013, issued in corresponding European Patent Application No. 10845123.8.

International Search Report issued Mar. 10, 2011 in corresponding International Patent Application No. PCT/CN2010/080480.

Written Opinion of the International Searching Authority issued Mar. 10, 2011 in corresponding International Patent Application No. PCT/CN2010/080480.

"Seamless MPLS", Juniper Network White Paper, Jan. 2010, pp. 1-11.

N. Leymann, Ed., "Seamless MPLS Architecture", Internet Engineering Task Force Internet Draft, Oct. 2009, pp. 1-24.

\* cited by examiner

METHOD, APPARATUS, AND SYSTEM FOR DISTRIBUTING LABEL IN SEAMLESS MULTI-PROTOCOL LABEL SWITCHING NETWORK

This application is a continuation of International Application No. PCT/CN2010/080480, filed on Dec. 30, 2010, which claims priority to Chinese Patent Application No. 201010106598.4, filed on Feb. 5, 2010, both of which are hereby incorporated by reference in their entireties.

TECHNICAL FIELD

The present invention relates to the field of multi-protocol label switching technologies, and in particular, to a method, apparatus, and system for allocating a label in a seamless multi-protocol label switching network.

BACKGROUND

Pseudowire (PW) is a mechanism for carrying critical elements of one emulation service from one provider edge (PE) to another over a packet switched network (PSN). Multiple types of services are emulated using one tunnel on the PSN. The multi-protocol label switching (MPLS) tunnel is commonly used in the PSN.

Figure 1:
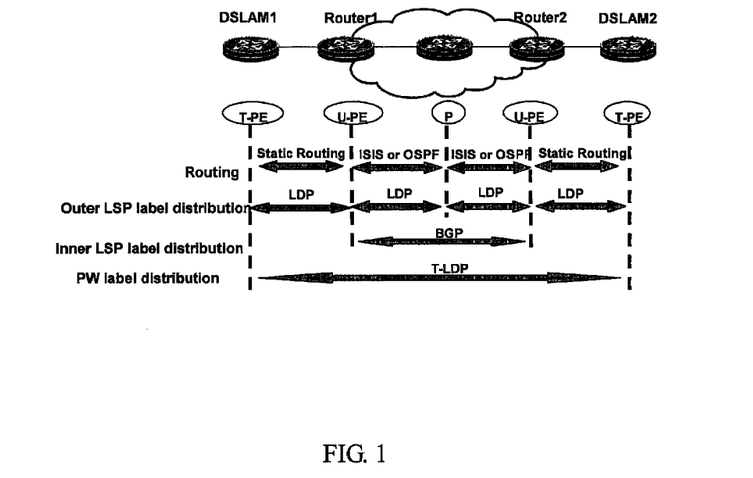
FIG. 1 is a schematic diagram of an architecture a seamless MPLS network according to the prior art.

Referring to FIG. 1, a seamless MPLS network based on pseudowire emulation edge-to-edge (PWE3) is illustrated. A terminating provider edge (T-PE) (for example, an access node) uses static routing. A commonly used access node is a digital subscriber line access multiplexer (DSLAM) or an optical network unit (ONU).

The user-facing provider edge (U-PE), which is also referred to as a router, directly connected to the access node allocates the static routing of the access node to an intermediate system to intermediate system (ISIS) domain. The T-PE allocates outer label switched path labels by using Label Distribution Protocol (LDP). The router allocates inner LSP labels by using Border Gateway Protocol (BGP) between the U-PEs.

In a seamless MPLS network, the PW is an end-to-end single segment PW (SS PW). To be specific, multiple-segment PW is not used from the access node on one end of the network to the access node on the peer end of the network. In addition, the access node further supports a flow label, for balancing PW load. Generally, the T-PE needs to support three layers of labels (an outer LSP label, a PW label and/or a flow label), and the U-PE needs to support four layers of labels (an outer LSP label, an inner LPS label, a PW label and/or a flow label).

During the implementation of the present invention, the inventor finds that the prior art has the following problems:

In the seamless MPLS network, an end-to-end MPLS architecture is used. MPLS is extended to the access node. It is a critical issue during MPLS network construction that how the U-PE supports splicing of the outer LSP of the access node and the aggregation network and the core network.

In addition, the number of access nodes such as the ONU and DSLAM is large. Therefore, the costs must be low. For this reason, the ONU and DSLAM are generally Layer 2 device only. However, to support MPLS on the access nodes, all ONUs and DSLAMs need to upgrade the control plane to Layer 3, and must support a routing protocol, an MPLS label allocation protocol, and a PW label allocation protocol. This increases the complexity of the ONUs and DSLAMs, for which the costs is increased and scalability is poor.

SUMMARY OF THE INVENTION

To solve the problem in the prior art, embodiments of the present invention provides a method, apparatus, and system for allocating a label in a multi-protocol label switching network.

To achieve the above objective, various embodiments of the present invention provide the technical solutions as follows:

A method for allocating a label in a seamless multi-protocol label switching network is provided. The method includes:

obtaining label information of a first access node, where the label information includes the pseudowire (PW) destination address of the first access node;

sending the label information to a second router by using a Border Gateway Protocol (BGP) message or a Target-Label Distribution Protocol (T-LDP) message so that the second router configures a PW label and/or a flow label of the first access node to a second access node by using an access network configuration protocol according to the label information.

An apparatus for allocating a label in a seamless multi-protocol label switching network is provided. The apparatus includes:

an obtaining unit, configured to obtain label information of a first access node, where the label information includes the pseudowire PW destination address of the first access node;

a sending unit, configured to send the label information to a second router by using a Border Gateway Protocol (BGP) message or a Target-Label Distribution Protocol (T-LDP) message so that the second router configures a PW label and/or a flow label of the first access node to a second access node by using an access network configuration protocol according to the label information.

A system for allocating a label in a seamless multi-protocol label switching network, comprising: a router and a server, where the server is configured to preconfigure a mapping between port information and a PW destination address, and allocate a PW destination address according to the mapping; and the router is configured to obtain the PW destination address of a first access node from the server and obtain label information of the first access node, wherein the label information comprises the PW destination address of the first access node; and send the label information to a second router by using a Border Gateway Protocol (BGP) message or a Target-Label Distribution Protocol (T-LDP) message so that the second router configures a PW label and/or a flow label of the first access node to a second access node by using an access network configuration protocol.

According to the technical solutions provided in the embodiments of the present invention, in a seamless MPLS network, the access segment network uses the access network configuration protocol, the core segment network uses the BGP protocol or the T-LDP protocol, the router in the core segment network obtains the label information of the access node and sends the label information to the non-adjacent router of the access node to configure the label information on the second access node.

According to the technical solutions provided in the embodiments of the present invention, a new solution that the router supports the LSP at the outer layer of the access node is combined with the aggregation network and the core network is provided, and in addition the access node is not required to support the Layer 3 control plane protocol necessarily. This greatly reduces the complexity of the access node device, effectively cuts down the operation costs for the operator, and enhances the scalability of the system.

BRIEF DESCRIPTION OF THE DRAWINGS

To make the technical solutions provided in embodiments of the present invention or the prior art clearer, the accompanying drawings for illustrating the embodiments of the present invention or the prior art are briefly described below. Apparently, the accompanying drawings are exemplary only, and a person having ordinary skill in the art can derive other drawings from such accompanying drawings without any creative effort.

DETAILED DESCRIPTION OF THE EMBODIMENTS

The technical solution disclosed in embodiments of the present invention is described below with reference to embodiments and accompanying drawings. Evidently, the embodiments are exemplary only. A person having ordinary skill in the art can derive other embodiments from the embodiments given herein without making any creative effort, and all such embodiments fall within the protection scope of the present invention.

Figure 2:
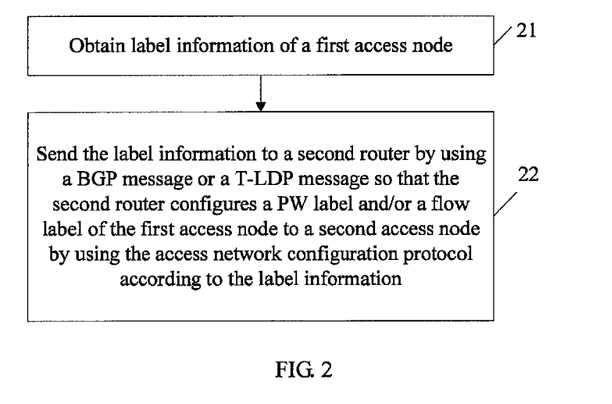
FIG. 2 is a flowchart of a method for allocating a label in a seamless MPLS network according to an embodiment of the present invention.

An embodiment of the present invention provides a method for allocating a label in a seamless multi-protocol label switching network. Referring to FIG. 2, the method includes:

Step 21: Obtain label information of a first access node, where the label information includes a PW destination address of the first access node.

For example, the first access node sends port information of the first access node to a server by using an access network configuration protocol, where the port information may be forwarded by a first router. The server obtains the PW destination address according to the port information of the first access node and a preconfigured mapping between port information and a PW destination address. The first router receives the label information of the first access node sent by the server, where the label information includes the PW destination address. The first router allocates a PW label and/or a flow label according to the PW destination address.

Alternatively, after obtaining the PW destination address, the server may further allocate the PW label and/or flow label according to the PW destination address, and sends the label information of the first access node to the first router, where the label information includes the PW destination address and the PW label and/or the flow label allocated by the server.

Step 22: Send the label information to a second router by using a Border Gateway Protocol (BGP) message or a Target-Label Distribution Protocol (T-LDP) message so that the second router configures the label information to a second access node by using an access network configuration protocol.

For example, the first router sends the label information to the second router by using the BGP message or the T-LDP message, where the label information includes the PW destination address and the PW label and/or the flow label. The PW label and/or the flow label may be allocated by the first router or the server. The second router configures the PW label and/or the flow label to the second access node by using the access network configuration protocol.

The first router may also only carry the PW destination address in the label information when sending the label information to the second router by using the BGP message or the T-LDP message. The second router sends the PW destination address to a server in a management domain where the second router is located; the server allocates a PW label and/or a flow label according to the PW destination address, and sends the PW label and/or the flow label to the second router; and the second router configures the PW label and/or the flow label to the second access node by using the access network configuration protocol. When this solution is used, it should be ensured that the mapping between port information and a PW destination address that is preconfigured on the server in the management domain where the second router is located is the same as the mapping between port information and a PW destination address that is preconfigured on the server in a first management domain; and it should be ensured that the PW label and/or the flow label to the PW destination address that are allocated by the server in a second management domain is the same as the PW label and/or the flow label to the PW destination address that are allocated by the server in the first management domain. However, the specific implementation is not limited. For example, the server in the second management domain and the server in the first management domain may be configured the same mapping between port information and a PW destination address and allocate the same PW label and/or flow label to the PW destination address concurrently; alternatively, after the server in the first management domain is preconfigured the mapping between the port information and the PW destination address or allocates the PW label and/or the flow label, the server in the first management domain communicates with the server in the second management domain, and sends the obtained mapping, and the allocated PW label and/or flow label to the server in the second management domain for storage.

Optionally, the label information may further include a PW source address. The server may be implemented by an IP edge node or a new dedicated device.

To clearly describe the technical solutions of the embodiments of the present invention, the embodiments use the words such as "first" and "second" to distinguish items having the same functions or similar functions. The skilled person should understand that such words do not limit the number of items or the sequence of action execution.

In the embodiments of the present invention, an upper layer network device such as a router (or referred to as a U-PE) in a core segment network performs steps 21 and 22. Referring to FIG. 1, in the embodiment, the network between router 1 and router 2 is referred to as the core segment network, the network between DSLAM 1 (the first access node) and router 1 is referred to as a access segment network, and the network between router 2 to DSLAM 2 (the second access node) is also referred to as a access segment network.

In the embodiments of the present invention, the access segment network uses a non-routing protocol, for example, uses the access network configuration protocol to allocate a label. The access network configuration protocol varies with the type of access network. For example, when an access node is an ONU, the access network configuration protocol may be the Optical Network Terminal Management and Control Interface (ONT Management and Control Interface, OMCI) Protocol; when the access node is a DSLAM, the access network configuration protocol may be the Access Node Control Protocol (ANCP); and when the access node is an Ethernet switch, the access network configuration protocol may be the Ethernet Operations, Administration and Maintenance (Ethernet OAM) Protocol. Those merely are typical scenarios of the access network configuration protocol. For example, the ANCP may also be applicable to the ONU, OLT, or Ethernet switch, the OMCI may also be applicable to the Ethernet switch, which also uses the TR069 protocol (a terminal management protocol).

According to the technical solutions provided in the embodiments of the present invention, in a seamless MPLS network, the access segment network uses the access network configuration protocol, the core segment network uses the BGP protocol or the T-LDP protocol, the router in the core segment network obtains the label information of the access node and sends the label information to the non-adjacent router of the access node to configure the label information on the second access node.

According to the technical solutions provided in the embodiments of the present invention, a new solution that the router supports the LSP at the outer layer of the access node is combined with the aggregation network and the core network is provided, and in addition the access node is not required to support the Layer 3 control plane protocol. This greatly reduces the complexity of the access node device, effectively cuts down the operation costs for the operator, and enhances the scalability of the system.

Figure 3A:
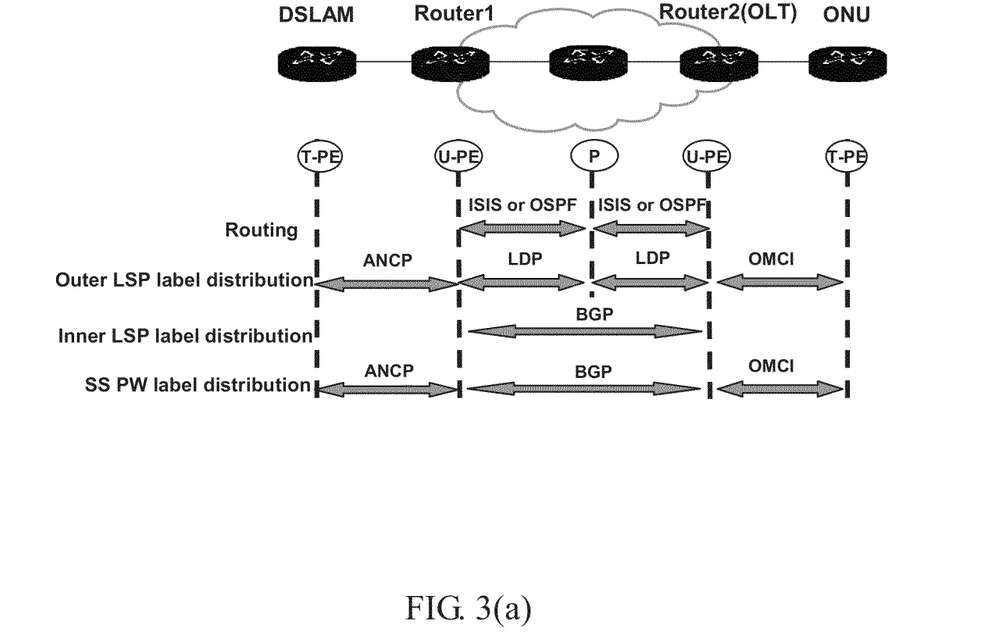
FIG. 3(a) is a schematic diagram of an architecture of a seamless MPLS network according to an embodiment of the present invention.

The following describes a method for allocating a label in a seamless MPLS network according to another embodiment of the present invention. FIG. 3(a) is a schematic diagram of an architecture of a seamless MPLS network according to an embodiment of the present invention. In this embodiment, the network between a T-PE and a U-PE is referred to as the access segment network; as shown in FIG. 3(a), the network between the DSLAM and router 1 is referred to as the access segment network, the network between the ONU and router 2 is referred to as the access segment network, the network between the U-PE on one end and the U-PE on the other end is referred to as the core segment network, and the network between router 1 and router 2 illustrated in FIG. 3(a) is referred to as the core segment network.

In comparison with FIG. 1, it can be seen that in this embodiment, one LSP outer label or a group of LSP outer labels are allocated for the access node by using ANCP, OMCI, or Ethernet OAM, or the flow label is allocated, or the single segment (SS) PW label (hereinafter referred to as the PW label) is allocated by using ANCP, OMCI, or Ethernet OAM in combination with BGP or T-LDP.

Or, referring to FIG. 3(b), in this embodiment, one LSP outer label or a group of LSP outer labels are allocated for the access node by using ANCP, OMCI, or Ethernet OAM, or the SS PW label (hereinafter referred to as the PW label) is allocated, or the flow label is allocated.

Figure 4:
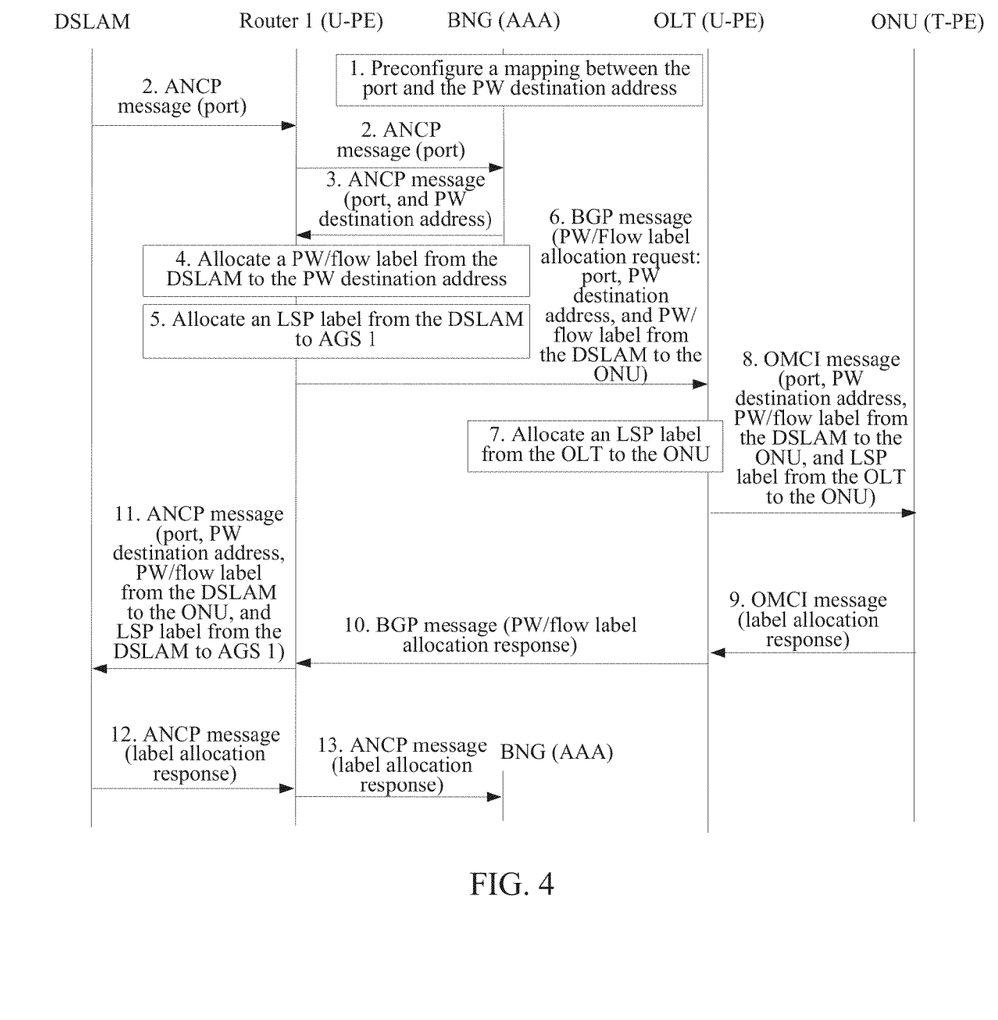
FIG. 4 is a flowchart of a method for allocating a label in a seamless MPLS network according to an embodiment of the present invention.

Based on the architecture illustrated in FIG. 3(a), the following describes the scenario that a first access node on one end is a DSLAM, and a second access node on the remote end is an ONU. Referring to FIG. 4, the following steps are included:

Step 1: Preconfigure a mapping between DSLAM port information and PW destination address on a server (for example, an AAA server or a policy server). The server may be configured on an IP edge node (for example, a BNG), or configured on a dedicated server device. The server device is capable of communicating with the IP edge node. Here, the case that the above server is configured at the IP edge node is used as an example for illustration. The PW destination address is the address of a remote access node.

Step 2: When the port on the DSLAM goes online or is enabled, the DSLAM reports the port information to router 1 (U-PE) by using an ANCP message. The ANCP message may carry one piece of information or a group of port information for requesting one PW destination address or a group of PW destination addresses correspondingly.

Router 1 forwards the DSLAM port information to the IP edge node by using the ANCP message. The IP edge node queries the server according to the reported port information and obtains the PW destination address corresponding to the port. Alternatively, a network management platform directly delivers the DSLAM port information to the IP edge node. The IP edge node queries the server according to the delivered port information and obtains the PW destination address corresponding to the port information. Through such processing, the access node does not need to configure the PW destination address, which reduces the complexity in network management and further cuts down the operation costs for the operator.

Different messages may be used to report the port information for different types of access node. For example, when the access node is an ONU, the port information is reported to the IP edge node by using an OMCI message; and when the access node is an Ethernet switch, the port information is reported to the IP edge node by using an Ethernet OAM message.

The port information corresponds to attachment circuit (AC). In the case of PON access, the port information includes ONU port information and/or OLT port information. In the case of DSL access, the port information includes DSL port information. In the case of Ethernet access, the port information includes Ethernet port information. AC ID may be port information or a logical sequence of the port information.

The ONU port information or the DSL port information may be an access loop ID (access loop identifier) or a circuit ID. For example, when the port is based on the DSL line in asynchronous transfer mode (ATM) mode, the DSL port information or the ONU port information may be DSLAM/ONU ID atm slot2/port2:vpi.vci; when the port is based on the DSL line in Ethernet mode, the DSL port information or the ONU port information may be DSLAM/ONU ID eth slot2/port2[:vlan-id]. The OLT port information may be Access-Node-Identifier slot1/port1[:vlan-id].

Access-Node-Identifier is the identifier of the OLT, and slot1/port1 is one or any combination of the chassis ID, rack ID, frame ID, slot ID, sub-slot ID, port ID; ONUID is the ID of the ONU, slot2/port2 is one or any combination of the chassis ID, rack ID, frame ID, slot ID, sub-slot ID, port ID; vpi.vci is the virtual path identifier (VPI) and virtual channel identifier (VCI), and VLAN ID is the ID of the virtual local area network.

The ONU port or the DSL port or the Ethernet port may also be a specific type of ATM cell, TDM timeslot, ETH frame, or IP packet. For example, the ONU port information may include the VPI and VCI of ATM, TDM timeslot number, an MAC address, a VLAN ID, an Ethernet priority, an IP address, and a differentiated services code point (DSCP).

When a PW is established, generally one PW is established for each port. The port information is source port information. To be specific, when a PW from the first access node to the second access node is established, the port information is the port information of the first access node; when a PW from the second access node to the first access node is established, the port information is the port information of the second access node.

The port information may indicate the granularity of the PW. Whether the established PW is the desired PW may be determined according to the mapping between the port information and the PW destination address. The same description is applicable to the following related content.

Step 3: The IP edge node forwards the label information to router 1 by using the ANCP message. In this case, the label information carries the port information of the first access node and its corresponding PW destination address so that in the subsequent processes, router 1 can reply the information to the first access node.

Step 4: Router 1 allocates one PW label or a group of PW labels and corresponding flow labels, of the first access node, to the PW destination address (for example, the address of the second access node) according to the received port information and the corresponding PW destination address, and carries the PW label and/or the flow label of the first access node in the label information.

Step 5: Router 1 allocates one LSP label or a group of LSP labels between the first access node and router 1 according to actual requirements. For example, when an LSP is not established between the first access node and router 1, router 1 needs to establish a corresponding LSP, and allocate an LSP label between the first access node and router 1; or when different LSPs between the first access node and router 1 need to be established based on different users or services, router 1 needs to establish multiple LSPs, and allocate a group of LSP labels of the first access node to router 1; or when an LSP has been established between the first access node and router 1 and an LSP label between the first access node and router 1 has been allocated, no label allocation process is required and the allocated LSP label is used. The same description is applicable to the following related content.

Conventionally, when the LSP between the first access node and the second access node is established, because the corresponding LSP is established based on a request from the first access node, an LSP remote address needs to be configured for the first access node. The LSP remote address is the address of the second access node and the number of second access nodes corresponding to the first access nodes is generally large. Therefore, multiple LSP remote addresses need to be configured for the first access node. In the embodiments of the present invention, the LSP destination address may be stored on the server and queried by the access node. In this case, no LSP destination address needs to be configured for the first access node. Or, a one-hop LSP path from router 1 to the first access node is established by router 1 in downstream unsolicited (DU) mode, the LSP path from router 1 to router 2 is established, and a one-hop LSP path from the first access node to router 1 is established. In this case, no LSP destination address needs to be configured for the first access node either. Or, a one-hop LSP path from the first access node to router 1 is established in DoD mode after the first access node initiates a label allocation request to router 1, the LSP path from router 1 to router 2 is established, and a one-hop LSP path from router 1 to the first access node is established separately too. In this case, the LSP destination address of the first access node only needs to be configured to the address of router 1. In this way, the configuration complexity of the access node is reduced and the operation costs are cut down for the operator.

Step 6: Router 1 sends the label information to router 2 by using the BGP message or the T-LDP message. The label information may carry the port information of the first access node, the corresponding PW destination address, and one corresponding PW label or a group of corresponding PW labels and a corresponding flow label, of the first access node, to the PW destination address (for example, the address of the second access node).

Step 7: Router 2 (for example, an OLT) allocates one LSP label or a group of LSP labels between router 2 and the second access node according to actual requirements. For example, when the LSP is not established between the second access node and router 2, router 2 needs to establish the corresponding LSP, and allocate an LSP label between the second access node and router 2; or when different LSPs between the first access node and router 2 need to be established based on different users or services, router 2 needs to establish multiple LSPs, and allocate a group of LSP labels from the second access node to router 2; or when an LSP has been established between the second access node and router 2 and an LSP label between the second access node and router 2 has been allocated, no label allocation process is required and the allocated LSP label is used.

Step 8: Router 2 sends and configures the port information of the first access node, the corresponding PW destination address, the corresponding PW label or the group of corresponding PW labels and a corresponding flow label, of the first access node, to the PW destination address (for example, the address of the second access node), and the LSP label or the group of LSP labels between router 2 and the second access node (for example, an ONU) to the second access node by using an OMCI message.

Step 9: The second access node sends a label allocation response to router 2 by using an OMCI message.

Step 10: When labels on the second access node are allocated, router 2 may make a response to the allocation of the PW label and corresponding flow label, indicating whether the PW label and corresponding flow label are configured on the second access node successfully. If they are configured on the access node successfully, the subsequent steps are performed continually; otherwise, the process returns to step 4, and the PW label and corresponding flow label are allocated again or the establishment of the corresponding PW is terminated. This step is optional.

Step 11: Router 1 configures, on the first access node, the port information of the first access node, the corresponding PW destination address, the corresponding PW label or the group of corresponding PW labels and a corresponding flow label, of the first access node, to the PW destination address (for example, the address of the second access node) and corresponding flow label, and the LSP label or the group of LSP labels between router 2 and the first access node (for example, an ONU). A person having ordinary skill in the art should understand that step 11 are independent of steps 6-9. To be specific, step 11 may be performed before or after steps 6-9. If the response for allocation of the flow label is received in step 10, step 11 is performed after the PW label and corresponding flow label have been configured on the second access node successfully. In this way, the following may be prevented: the labels of the first access node and the second access node are inconsistent.

Step 12: The first access node sends a label allocation response to router 1 by using an ANCP message.

Step 13: Router 1 forwards the received label allocation response to the IP edge node by using an ACNP message.

Figure 5:
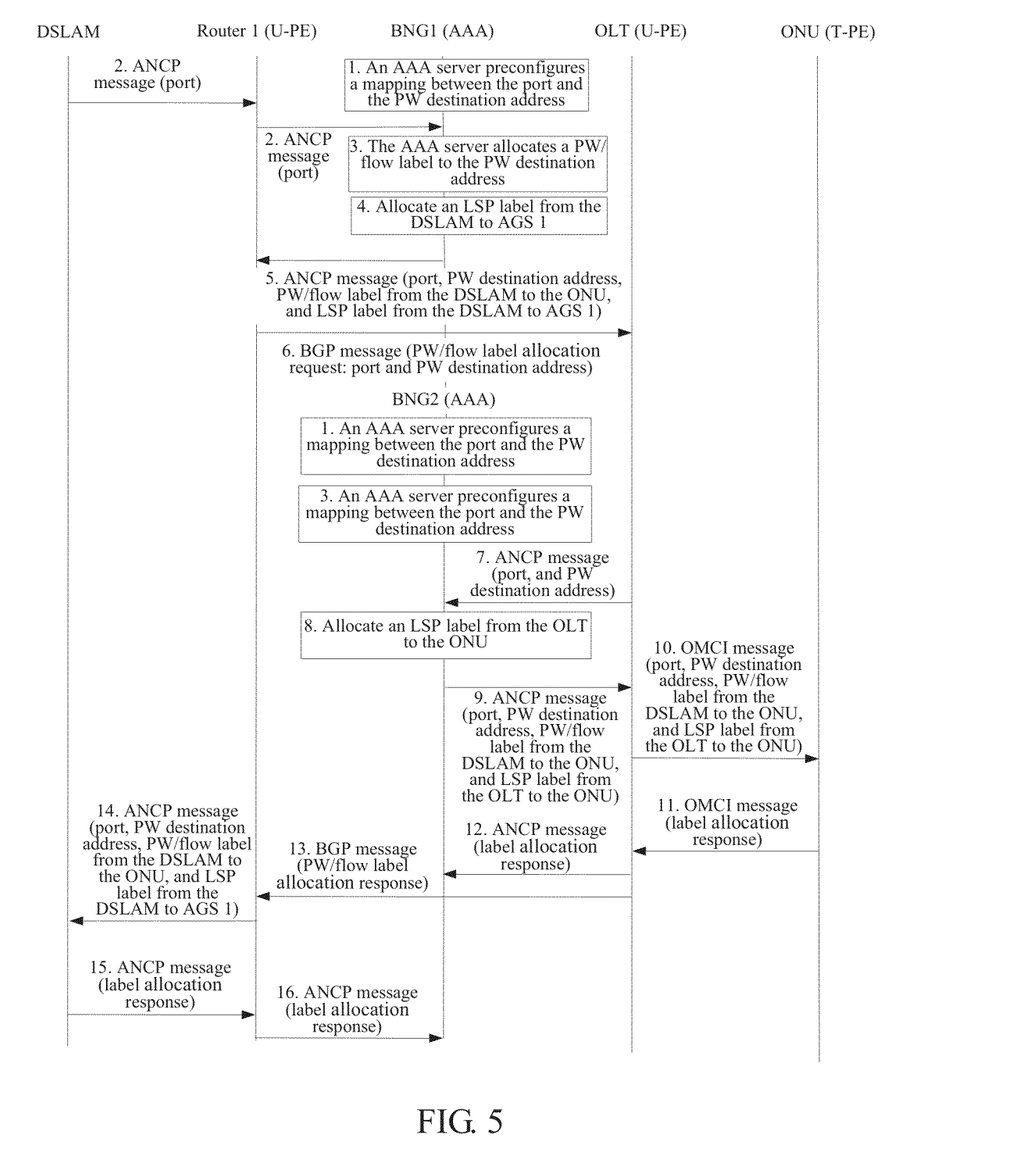
FIG. 5 is a flowchart of a method for allocating a label in a seamless MPLS network according to an embodiment of the present invention.

Further, when the access nodes belong to different management domains, an embodiment of the present invention provides a cross-management domain and centralized label allocation process. Referring to FIG. 5, the access nodes DSLAM and ONU belong to different management domains. In this case, in different management domains, a server in a corresponding management domain allocates labels. The server may be implemented by an IP edge node or a separate device. The server may be an authentication, authorization and accounting (AAA) server. In the embodiments of the present invention, the scenario that the AAA server may be implemented in a broadband network gateway (BNG) and the AAA server allocates the labels is used as an example for illustration. To be specific, BNG 1 and router 1 (or referred to as the first router) are located in the first management domain, and BNG 2 and router 2 (or referred to as the second router) are located in the second management domain. In this case, the second router sends the PW destination address to the server (BNG 2) in the second management domain; and the server in the second management domain determines the label information according to the PW destination address and sends the label information to the second router so that the second router configures the label information to the second access node.

To clearly describe the technical solutions of the embodiments of the present invention, the embodiments use the words such as "first" and "second" to distinguish items having the same or similar functions. The skilled person should understand that such words do not limit the number of items or the sequence of action execution.

The outer LSP and inner LSP between U-PEs are generally established during network construction.

Step 1: Preconfigure a mapping between DSLAM port information and PW destination address on a server (for example, an AAA server or a policy server). The server may be configured on an IP edge node (for example, a BNG), or configured on an independent server device. The server device is capable of communicating with the IP edge node. Here, the case that the server is an AAA server and the AAA server is configured in the BNG is used as an example for illustration. The PW destination address is the address of a remote access node (that is, the second access node, for example, an ONU).

The first management domain where the DSLAM is located includes BNG 1 and the second management domain where the ONU is located includes BNG 2. It should be ensured that the mapping between the port information and the PW destination address that is preconfigured by BNG 2 in a second management domain is the same as that preconfigured by BNG 1 in a first management domain; and it should be ensured that the PW label and/or the flow label to the PW destination address that are allocated by the server in the second management domain are the same as the PW label and/or the flow label to the PW destination address that are allocated by the server in a first management domain. However, the specific implementation is not limited. For example, BNG 2 in the second management domain and BNG 1 in the first management domain may be preconfigured the same mapping between port information and a PW destination address and allocate the same PW label and/or flow label to the PW destination address concurrently; alternatively, after BNG 1 in the first management domain is preconfigured the mapping between port information and a PW destination address or allocates the PW label and/or the flow label, BNG 1 in the first management domain communicates with BNG 2 in the second management domain, and sends the obtained mapping, and the allocated PW label and/or flow label that are preconfigured in BNG 1 to BNG 2 in the second management domain, and BNG 2 stores the mapping.

Step 2: When the port on the DSLAM goes online or is enabled, the DSLAM reports the port information to router 1 (U-PE) by using an ANCP message. The ANCP message may carry one piece of port information or a group of port information for requesting one PW destination address or a group of PW destination addresses correspondingly.

Router 1 reports the corresponding port information to BNG 1 by using the ANCP message.

Conventionally, when the LSP between the first access node and the second access node is established, because the corresponding LSP is established based on a request from the first access node, an LSP remote address needs to be configured for the first access node. The LSP remote address is the address of the second access node and the number of second access nodes corresponding to the first access nodes is generally large. Therefore, multiple LSP remote addresses need to be configured for the first access node. In the embodiments of the present invention, the LSP destination address may be set on the server and queried by the access node. In this case, no LSP destination address needs to be configured for the first access node. Or, a one-hop LSP path from router 1 to the first access node is established. In this case, no LSP destination address needs to be configured for the first access node either. Or, a one-hop LSP path from the first access node to router 1 is established in DoD mode after the first access node initiates a label allocation request to router 1, the LSP path from router 1 to router 2 is established, and a one-hop LSP path from router 1 to the first access node is established separately too. In this case, the LSP destination address of the first access node only needs to be configured to the address of router 1. In this way, the configuration complexity of the access node is reduced and the operation costs are cut down for the operator.

Step 3: BNG 1 allocates one PW label or a group of PW labels and corresponding flow labels from the DSLAM to the PW destination address (for example, the address of the ONU) according to the port information and corresponding PW destination address.

Step 4: BNG 1 allocates LSP label or a group of LSP labels, of the first access node, to router 1 according to actual requirements. For example, when the LSP is not established between the first access node and router 1, BNG 1 needs to establish the corresponding LSP, and allocate an LSP label between the first access node and router 1; or when different LSPs between the first access node and BNG 1 need to be established based on different users or services, BNG 1 needs to establish multiple LSPs, and allocate a group of LSP labels between the first access node to router 1; or when an LSP has been established between the first access node and router 1 and an LSP label between the first access node and router 1 has been allocated, no label allocation process is required and the allocated LSP label is used.

Step 5: BNG 1 sends the label information to router 1 by using an ANCP message. The label information includes the port information of the DSLAM, the corresponding PW destination address, and the corresponding PW label or the group of PW labels and corresponding flow labels from the DSLAM to the PW destination address (for example, the address of the ONU), and the LSP label from the DSLAM to router 1. The label information may also includes a PW source address.

Step 6: Router 1 sends the label information including the port information of the first access node and the corresponding PW destination address to router 2 (for example, the OLT) in the second management domain by using a BGP message or a T-LDP message.

Step 7: Router 2 sends the port information of the first access node and the corresponding PW destination address to BNG 2 by using an ANCP message, and requests the corresponding PW label or a group of PW labels and corresponding flow labels from the DSLAM to the PW destination address from BNG 2. BNG 2 determines the PW label and/or the flow label from the DSLAM to the PW destination address from the allocated labels according to the received PW destination address. In addition, BNG 2 determines whether to establish the LSP from router 2 to the remote access node. If the LSP needs to be established, step 8 is performed; if the LSP does not need to be established, a label allocation response message is sent to router 1. A person having ordinary skill in the art should understand that step 6 and step 7 are independent of each other, which may be performed in a random order or concurrently.

Step 8: BNG 2 allocates one LSP label or a group of LSP labels from router 2 to the second access node (for example, an ONU) according to the actual requirements.

Step 9: BNG 2 sends the port information of the first access node, the corresponding PW destination address, the PW label or the group of PW labels and/or flow labels from the DSLAM to the PW destination address (for example, the address of the second access node), and the LSP label from router 2 to the second access node (ONU) to router 2 by using an ANCP message.

Step 10: Router 2 configures the port information of the first access node, the corresponding PW destination address, the PW address or a group of PW addresses, of the first access node, to the PW destination address (for example, the address of the second access node) and corresponding flow label, and the LSP label or a group of LSP labels between router 2 and the second access node (for example, an ONU) to the second access node by using an OMCI message.

The message types used for sending the addresses and labels are for illustration purpose merely. If different protocols are used in different access segments, protocol conversion may be involved, for example, protocol conversion between ANCP and OMCI. Optionally, the label information may further include the PW source address.

Step 11: The second access node sends a label allocation response to router 2 by using an OMCI message.

Step 12: Router 2 forwards the label allocation response to BNG 2 by using an ACNP message.

Step 13: When labels on the second access node are allocated, route 2 makes a response to allocation of the PW label and/or flow label, indicating whether the PW label and corresponding flow label are configured on the remote access node successfully.

If they are configured on the remote access node successfully, the subsequent steps are performed continually; otherwise, the process returns to step 4, and the PW label and corresponding flow label are allocated again or the establishment of the corresponding PW is terminated.

Step 14: Router 1 configures the port information of the first access node, the corresponding PW destination address, the PW address or a group of PW addresses from the DSLAM to the PW destination address and corresponding flow label, and the LSP label or a group of LSP labels and/or flow labels between the DSLAM and router 1 to the DSLAM.

Step 15: The DSLAM sends a label allocation response to router 1 by using an ANCP message.

Step 16: Router 1 forwards the received label allocation response to BNG 1 by using an ACNP message.

Figure 3B:
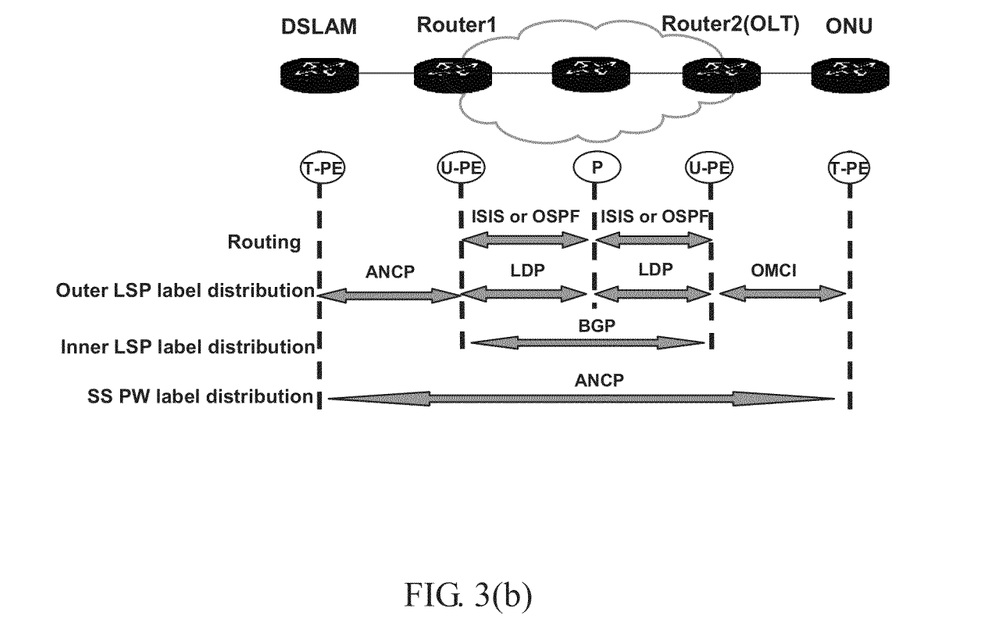
FIG. 3(b) is a schematic diagram of another architecture of a seamless MPLS network according to an embodiment of the present invention.
Figure 6:
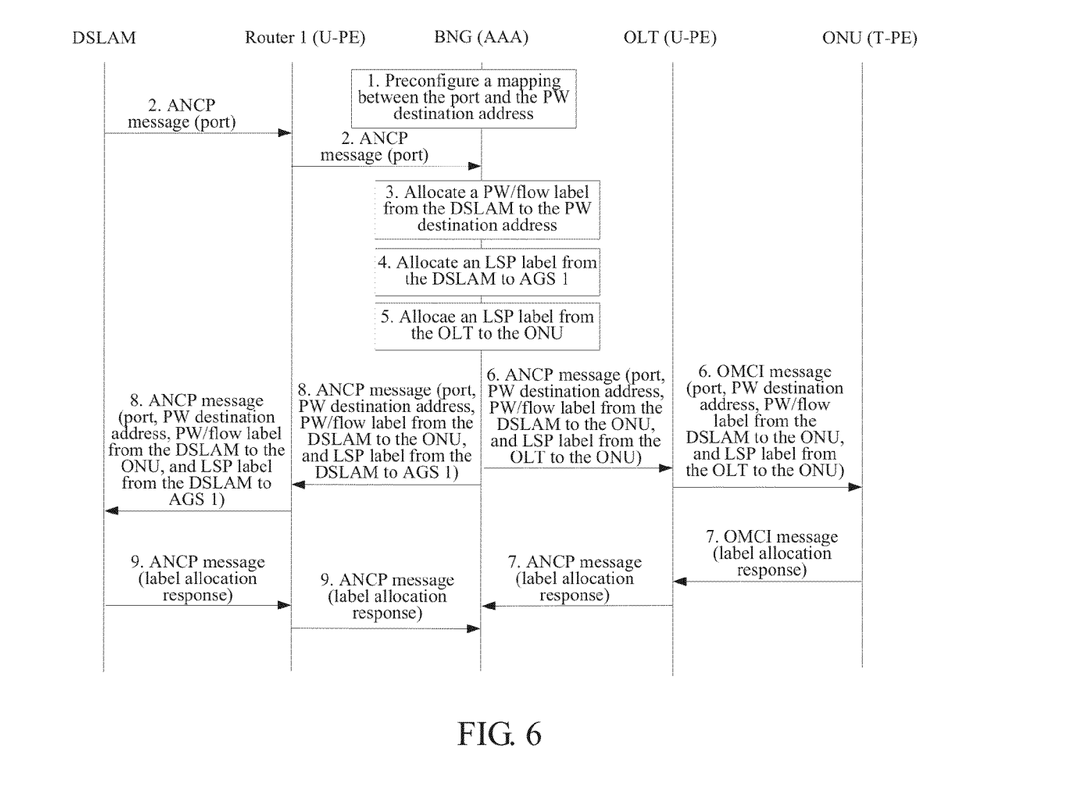
FIG. 6 is a flowchart of a method for allocating a label in a seamless MPLS network according to an embodiment of the present invention.

Further, based on the network architecture illustrate in FIG. 3(b), an embodiment of the present invention provides a centralized label allocation method in the case of label allocation in the same management domain. Referring to FIG. 6, the access nodes DSLAM and ONU belong to the same management domain. The following steps are specifically included:

Step 1: Preconfigure a mapping between DSLAM port information and PW destination address on a server (for example, an AAA server or a policy server). The server may be configured on an IP edge node (for example, a BNG), or configured on an independent server device. The server device is capable of communicating with the IP edge node. Here, the case that the above server is configured at the BNG is used as an example for illustration. The PW destination address is generally the address of the second access node (that is, the remote access node).

Step 2: When the port on the DSLAM goes online or is enabled, the DSLAM reports the port information to router 1 (U-PE) by using an ANCP message. The ANCP message may carry one piece of port information or a group of port information for requesting one PW destination address or a group of PW destination addresses correspondingly.

Router 1 reports the corresponding port information of the first access node to the BNG by using the ANCP message.

Conventionally, when the LSP between the first access node and the second access node is established, because the corresponding LSP is established based on a request from the first access node, an LSP remote address needs to be configured for the first access node. The LSP remote address is the address of the second access node and the number of second access nodes corresponding to the first access nodes is generally large. Therefore, multiple LSP remote addresses need to be configured for the first access node. In the embodiments of the present invention, the LSP destination address may be set on the server and queried by the access node. In this case, no LSP destination address needs to be configured for the first access node. Or, a one-hop LSP path from router 1 to the first access node is established. In this case, no LSP destination address needs to be configured for the first access node either. Or, a one-hop LSP path from the first access node to router 1 is established in DoD mode after the first access node initiates a label allocation request to router 1, the LSP path from router 1 to router 2 is established, and a one-hop LSP path from router 1 to the first access node is established separately too. In this case, the LSP destination address of the first access node only needs to be configured to the address of router 1. In this way, the configuration complexity of the access node is reduced and the operation costs are cut down for the operator.

Step 3: A BNG allocates one PW label or a group of PW labels and/or a flow label from the DSLAM to the PW destination address (for example, the address of the second access node) according to the port information and corresponding PW destination address.

Step 4: The BNG allocates one LSP label or a group of LSP labels from the DSLAM to router 1 according to actual requirements.

Step 5: The BNG allocates one LSP label or a group of LSP labels from router 2 (for example, an OLT) to the second access node (for example, an ONU) according to the actual requirements.

Step 6: Router 2 configures the port information of the first access node, the PW destination address, the PW label and/or the flow label from the DSLAM to the PW destination address, and the LSP label from router 2 to the remote access node on the remote access node.

Step 7: The remote access node sends a label allocation response to router 2 by using an OMCI message. Router 2 forwards the label allocation response to the BNG by using an ANCP message.

Step 8: The BNG sends the port information of the first access node, the PW destination address, the PW/flow label from the DSLAM to the PW destination address, and the LSP label from the DSLAM to router 1 by using an ANCP message. Router 1 forwards them to the access node by using an ANCP message.

Step 9: The DSLAM sends the label allocation response to router 1 by using an ACNP message. Router 1 forwards the received label allocation response to the BNG by using an ACNP message.

During the message interaction, the case that the ANCP and OMCI messages are used as an example for illustration, but is not limited to such case. Different types of messages may be used for different types of access node. In addition, optionally, the message may carry a PW source address.

In conclusion, according to the technical solutions provided in the embodiments of the present invention, in a seamless MPLS network, the core segment network allocates the PW destination address for the access node and allocates labels by using the access network configuration protocols. Therefore, no PW destination address or LSP remote address needs to be configured on the access node, and the access node is not required to support the Layer 3 control plane protocol necessarily. The technical solutions provided in the embodiments of the present invention greatly reduces the complexity of the access node device, effectively cuts down the operation costs for the operator, and enhances the scalability of the system.

Figure 7:
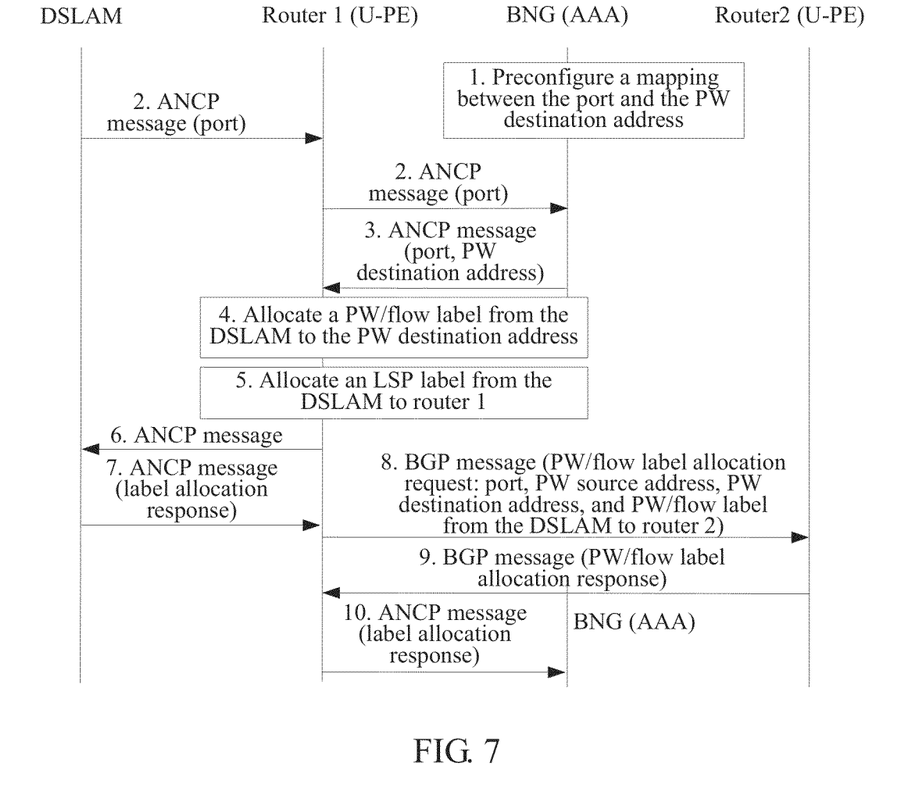
FIG. 7 is a flowchart of a method for allocating a label in a seamless MPLS network according to an embodiment of the present invention.

Further, based on the network architecture illustrated in FIG. 3(*a*), when a PW needs to be established from the first access node to a router (for example, router 2) that is not adjacent to the first access node, an embodiment of the present invention provides a label allocation process. Referring to FIG. 7, steps 1-5 can refer to steps 1-5 illustrated in FIG. 4.

After step 5, the label information is first configured on the first access node (DSLAM), and then sent to router 2. In the scenario illustrated in FIG. 7, the PW only from the DSLAM to router 2 is established, and the label information does not need to be configured on the second access node. After step 5, the following processing is included:

Step 6: Router 1 configures the label information to the DSLAM by using an ACNP message. The label information may include the port information of the first access node, the PW source address, the PW destination address, the PW label and/or the flow label from the DSLAM to router 2, and the LSP label from the DSLAM to router 1.

Step 7: The DSLAM sends a label allocation response to router 1 by using an ANCP message.

Step 8: After receiving a label allocation response, router 1 sends the label information to router 2 by using a BGP message or a T-LDP message to router 2, requesting allocation of the PW label and/or the flow label. The label information includes the port information of the first access node, the PW source address, the PW destination address, and the PW label and/or the flow label from the DSLAM to router 2.

Step 9: Router 2 feeds back the allocation response of the PW label and/or the flow label to router 1 by using a BGP message or a T-LDP message.

Step 10: Router 1 forwards the received label allocation response to the IP edge node (for example, a BNG) by using an ACNP message.

In embodiments of the present invention, the execution sequence of the steps is not limited. For example, in the process illustrated in FIG. 4, the label information may also be first configured on the first access node (DSLAM), and then configured on the second access node (ONU). During specific operations, steps 11 and 12 illustrated in FIG. 4 may be performed first, then steps 6-10 may be performed, and finally step 13 is performed. Alternatively, in the process illustrated in FIG. 7, steps 8 and 9 are performed first, then steps 6 and 7 are performed, and finally step 10 is performed.

According to the technical solutions provided in the embodiments of the present invention, in a seamless MPLS network, the access segment network uses the access network configuration protocol, the core segment network uses the BGP protocol or the T-LDP protocol, the router in the core segment network obtains the label information of the access node and sends the label information to the non-adjacent router of the access node to configure the label information on the second access node.

According to the technical solutions provided in the embodiments of the present invention, a new solution that the router supports the LSP at the outer layer of the access node is combined with the aggregation network and the core network is provided, and in addition the access node is not required to support the Layer 3 control plane protocol necessarily. This greatly reduces the complexity of the access node device, effectively cuts down the operation costs for the operator, and enhances the scalability of the system.

In the above embodiments, a mapping between a access node and a PW destination address is configured on the server in the core segment network. The server directly allocates the label information of the access node or the server sends the PW destination address to the router. The router allocates the label information. With such processing mode, the PW destination address and the LSP remote address do not need to be configured manually on the access node, which cuts down the operation costs for the operation and further reduces the complexity of the access node. Alternatively, the PW destination address may also be directly configured on the access node. The access node sends the PW destination address to the core segment network by using the access configuration protocol, and allocates labels in the core segment network. In this way, the requirement for the server is reduced.

Figure 8:
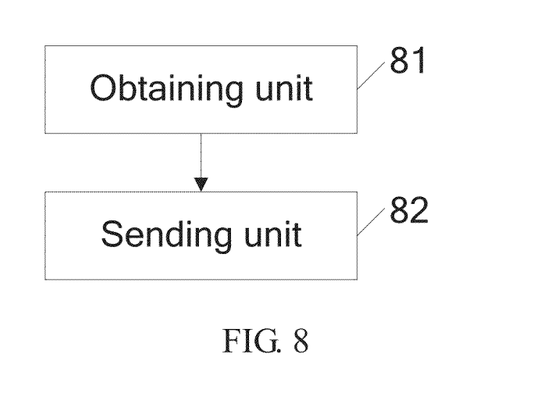
FIG. 8 is a schematic structural diagram of an apparatus for allocating a label in a seamless multi-protocol label switching network according to an embodiment of the present invention.

An embodiment of the present invention provides an apparatus for allocating a label in a seamless multi-protocol label switching network. Referring to FIG. 8, the apparatus includes:

an obtaining unit 81, configured to obtain label information of a first access node, where the label information comprises a PW destination address of the first access node;

a sending unit 82, configured to send the label information to a second router by using a BGP message or a T-LDP message so that the second router configures a PW label and/or a flow label of the first access node to a second access node by using an access network configuration protocol according to the label information.

The label information may include a PW label and/or a flow label of the first access node and may be obtained in different modes. For example, referring to FIG. 9, the apparatus may further include a receiving unit 83.

Figure 9:
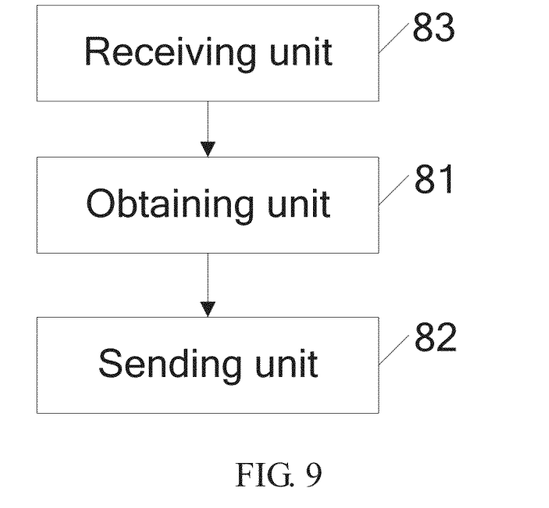
FIG. 9 is a schematic structural diagram of an apparatus for allocating a label in a seamless multi-protocol label switching network according to an embodiment of the present invention.

The receiving unit 83 is specifically configured to receive the PW destination address sent by a server, or configured to receive the PW destination address sent by the first access node by using the access network configuration protocol; and the obtaining unit 81 is specifically configured to allocate the PW label and/or the flow label according to the PW destination address;

or, the receiving unit 83 is configured to receive the label information sent by a server; and the obtaining unit 81 is specifically configured to obtain the label information from the receiving unit.

In the label allocation process according to the embodiments of the present invention, the label information may be first configured on the first access node (DSLAM), and the configured on the second access node (ONU); or the label information may be first configured on the second access node and then configured on the first access node.

In this case, the apparatus further includes a first access node configuration unit. The first access node configuration unit is configured to, after the second router configures the PW destination label and/or the flow label to the second access node, receive a label allocation response message (sent by using a BGP message or a T-LDP message) sent by the second router, and configure the PW label and/or the flow label to the first access node by using the access network configuration protocol; or the first access node configuration unit is configured to, before the sending unit sends the label information to the second router by using the BGP message or the T-LDP message, configure the PW label and/or the flow label of the first access node to the first access node.

In the apparatus embodiments of the present invention, the specific working modes of the function modules and units can refer to the method embodiments. All function modules and units according to the apparatus embodiments of the present invention may be either independently implemented or integrated in one or multiple units.

According to the technical solutions provided in the embodiments of the present invention, in a seamless MPLS network, the access segment network uses the access network configuration protocol, the core segment network uses the BGP protocol or the T-LDP protocol, the router in the core segment network obtains the label information of the access node and sends the label information to the non-adjacent router of the access node to configure the label information on the second access node.

According to the technical solutions provided in the embodiments of the present invention, a new solution that the router supports the LSP at the outer layer of the access node is combined with the aggregation network and the core network is provided, and in addition the access node is not required to support the Layer 3 control plane protocol necessarily. This greatly reduces the complexity of the access node device, effectively cuts down the operation costs for the operator, and enhances the scalability of the system.

An embodiment of the present invention provides a system for allocating a label in a seamless multi-protocol label switching network, including a router and a server.

the server is configured to preconfigure a mapping between port information and a PW destination address, and allocate a PW destination address according to the mapping; and the router is configured to obtain the PW destination address of a first access node from the server and obtain label information of the first access node, wherein the label information comprises the PW destination address of the first access node; and send the label information to a second router by using a Border Gateway Protocol BGP message or a Target-Label Distribution Protocol T-LDP message so that the second router configures a PW label and/or a flow label of the first access node to a second access node by using an access network configuration protocol.

Further, the label information may include a PW label and/or a flow label of the first access node.

the server is configured to send the PW destination address to the router, wherein the PW destination address is obtained by the server according to port information of the first access node sent by the first access node and a mapping between port information and a PW destination address preconfigured on the server; and the router is specifically configured to allocate the PW label and/or the flow label according to the PW destination address;

or the server is configured to allocate the PW label and/or the flow label according to port information of the first access node sent by the first access node and a mapping between port information and a PW destination address, and send the PW destination address, the PW label and/or the flow label to the router; and the router is configured to obtain the PW destination address, the PW label and/or the flow label from the server.

In the system provided in the embodiments of the present invention, a cross-management domain centralized label allocation method may also be implemented. For example, when the second router is located n the second management domain, in this scenario, the second router sends the label information to the server in the second management domain; the server in the second management domain determines the PW label and/or the flow label of the first access node according to the label information, and sends the PW label and/or flow label of the first access node to the second router so that the second router configures the PW label and/or the flow label of the first access node to the second access node by using the access network configuration protocol.

According to the technical solutions provided in the embodiments of the present invention, in a seamless MPLS network, the access segment network uses the access network configuration protocol, the core segment network uses the BGP protocol or the T-LDP protocol, the router in the core segment network obtains the label information of the access node and sends the label information to the non-adjacent router of the access node to configure the label information on the second access node.

According to the technical solutions provided in the embodiments of the present invention, a new solution that the router supports the LSP at the outer layer of the access node is combined with the aggregation network and the core network is provided, and in addition the access node is not required to support the Layer 3 control plane protocol necessarily. This greatly reduces the complexity of the access node device, effectively cuts down the operation costs for the operator, and enhances the scalability of the system.

It is understandable to the skilled person that all or part steps of the preceding steps can be implemented by hardware following instructions of programs. The programs may be stored in a computer readable storage medium. The storage medium may be ROM/RAM, a magnetic disk, or an optical disk.

In conclusion, the above are merely exemplary embodiments of the present invention. The scope of the present invention is not limited thereto. Variations or replacements readily apparent to a person skilled in the art within the technical scope of the present invention should fall within the scope of the present invention. Therefore, the protection scope of the present invention is subjected to the appended claims.

What is claimed is:

1. A method for allocating a label in a seamless multi-protocol label switching network based on pseudowire (PW) emulation edge-to-edge, the PW is an end-to-end single segment PW between the first access node and a second access node, comprising:
   obtaining, by a first router, label information of a first access node, wherein the label information comprises a PW destination address of the first access node and a single segment PW label of the end-to-end single segment PW between the first access node and the second access node, wherein the PW destination address of the first access node is thean address of the second access node;
   sending, by the first router, the label information, which includes the single segment PW label, to a second router by using a Border Gateway Protocol (BGP) message or a Target-Label Distribution Protocol (T-LDP) message;
   obtaining, by the second router, the single segment PW label carried by the BGP message or the T-LDP message;
   sending, by the second router, to the second access node, the obtained single segment PW label carried by the BGP message or the T-LDP message to the second access node by using a first access network configuration protocol,
   wherein the first access network configuration protocol is any one of Optical Network Terminal Management and Control Interface (OMCI) Protocol, Access Node Control Protocol (ANCP) Protocol, Ethernet Operations, Administration and Maintenance (Ethernet OAM) Protocol and TR069 protocol.

2. The method according to claim 1, wherein the obtaining label information of the first access node comprises:
   receiving, by the first router, the PW destination address sent by a server, and allocating the single segment PW label according to the PW destination address, wherein the PW destination address is obtained by the server according to port information of the first access node sent by the first access node and a mapping between the port information and a PW destination address preconfigured on the server; or
   receiving, by the first router, the PW destination address sent by a server, and the single segment PW label allocated by the server according to the PW destination address;
   wherein the PW destination address is obtained by the server according to port information of the first access node sent by the first access node and a mapping between the port information and a PW destination address preconfigured on the server; or
   receiving, by the first router, the PW destination address sent by the first access node by using a second access network configuration protocol, and allocating the single segment PW label according to the PW destination address;
   wherein the second access network configuration protocol is any one of OMCI Protocol, ANCP Protocol, Ethernet OAM Protocol and TR069 protocol.

3. The method according to claim 2, further comprising: after the second router sending the single segment PW label to the second access node by using the first access network configuration protocol, receiving, by the first router, a label allocation response message sent by the second router, and configuring the single segment PW label to the first access node by using the second access network configuration protocol.

4. The method according to claim 3, wherein the first access network configuration protocol and the second access network configuration protocol are different kinds of protocols.

5. The method according to claim 1, further comprising:
   after the second router sending the single segment PW label to the second access node by using the first access network configuration protocol, receiving, by the first router, a label allocation response message sent by the second router, and configuring the single segment PW label to the first access node by using a second access network configuration protocol;
   wherein the second access network configuration protocol is any one of OMCI Protocol, ANCP Protocol, Ethernet OAM Protocol and TR069 protocol.

6. The method according to claim 5, wherein the first access network configuration protocol and the second access network configuration protocol are different kinds of protocols.

7. An apparatus for allocating a label in a seamless multi-protocol label switching network based on pseudowire (PW) emulation edge-to-edge, the PW is an end-to-end single segment PW between a first access node and a second access node, the apparatus comprising:
   non-transitory computer readable storage medium that stores program(s); and
   computer hardware, configured by the program(s) which when executed by a computer processor, to implement:
      a function of a first router to obtain label information of the first access node, wherein the label information comprises a PW destination address of the first access node and a single segment PW label of the end-to-end single segment PW between the first access node and the second access node, wherein the PW destination address of the first access node is an address of the second access node;
      to send the label information, which includes the single segment PW label, to a second router by using a Border Gateway Protocol (BGP) message or a Target-Label Distribution Protocol (T-LDP) message, thereby the second router obtaining the single segment PW label carried by the BGP message or the T-LDP message to send the single segment PW label of the first access node to the second access node by using a first access network configuration protocol,
      wherein the first access network configuration protocol is any one of Optical Network Terminal Management and Control Interface (OMCI) Protocol, Access Node Control Protocol (ANCP) Protocol, Ethernet Operations, Administration and Maintenance (Ethernet OAM) Protocol and TR069 protocol.

8. The apparatus according to claim 7, the computer hardware further implements:
   to receive the PW destination address sent by a server, or to receive the PW destination address sent by the first access node by using a second access network configuration protocol message; and the function of the first router is configured to allocate the single segment PW label according to the PW destination address; or
   to receive the single segment PW label sent by a server; and the function of the first router is configured to obtain the single segment PW label.

9. The apparatus according to claim 8, wherein the first access network configuration protocol and the second access network configuration protocol are different kinds of protocols.

10. A system for allocating a label in a seamless multi-protocol label switching network based on pseudowire (PW) emulation edge-to-edge, the PW is an end-to-end single segment PW between a first access node and a second access node, comprising:
- a first router, a second router and a server, wherein the server is configured to preconfigure a mapping between port information and a PW destination address, and allocating a PW destination address to the first access node according to the mapping, wherein the PW destination address of the first access node is an address of the second access node;
- the first router is configured to obtain the PW destination address of the first access node from the server and obtain label information of the first access node, wherein the label information comprises the PW destination address of the first access node and a single segment PW label of the end-to-end single segment PW between the first access node and the second access node, and to send the label information, which includes the single segment PW label, to a second router by using a Border Gateway Protocol (BGP) message or a Target-Label Distribution Protocol (T-LDP) message; and
- the second router is configured to obtain the single segment PW label carried by the BGP message or the T-LDP message and to send, to the second access node, the obtained single segment PW label carried by the BGP message or the T-LDP message to the second access node by using a first access network configuration protocol, wherein the first access network configuration protocol is any one of Optical Network Terminal Management and Control Interface (OMCI) Protocol, Access Node Control Protocol (ANCP) Protocol, Ethernet Operations, Administration and Maintenance (Ethernet OAM) Protocol and TR069 protocol.

11. The system according to claim 10, wherein the server is configured to send the PW destination address to the first router, wherein the PW destination address is obtained by the server according to port information of the first access node sent by the first access node and a mapping between port information and a PW destination address preconfigured on the server; and the first router is configured to allocate the single segment PW label according to the PW destination address; or
- the server is configured to allocate the single segment PW label according to port information of the first access node sent by the first access node and a mapping between port information and a PW destination address, and send the PW destination address, the single segment PW label to the first router; and the first router is configured to obtain the PW destination address, the single segment PW label from the server.

12. The system according to claim 10, wherein the second router is further configured to configure the single segment PW label to the first access node by using a second access network configuration protocol;
- wherein the second access network configuration protocol is any one of OMCI Protocol, ANCP Protocol, Ethernet OAM Protocol and TR069 protocol.

13. The system according to claim 12, wherein the first access network configuration protocol and the second access network configuration protocol are different kinds of protocols.

* * * * *

UNITED STATES PATENT AND TRADEMARK OFFICE
CERTIFICATE OF CORRECTION

Page 1 of 1

PATENT NO. : 9,197,451 B2
APPLICATION NO. : 13/566450
DATED : November 24, 2015
INVENTOR(S) : Ruobin Zheng It is certified that error appears in the above-identified patent and that said Letters Patent is hereby corrected as shown below:

On the Title Page, item (73), Assignee, Line 1

Delete "TECNOLOGIES" and insert --TECHNOLOGIES--, therefor.

Second Page, Second Column, OTHER PUBLICATIONS, Line 18

Under "N. Leymann, Ed., "Seamless MPLS Architecture", Internet Engineering Task Force Internet Draft, Oct. 2009, pp. 1-24."

insert --Bryant et al., "Pseudo Wire Emulation Edge-to-Edge (PWE3) Architecture" Request for Comments 3985 <https://tools.ietf.org/html/rfc3985> published March 2005, last visited Jan. 23, 2015. *--.

Signed and Sealed this
First Day of March, 2016

Michelle K. Lee
*Director of the United States Patent and Trademark Office*